(12) United States Patent
Kircher

(10) Patent No.: US 7,934,736 B2
(45) Date of Patent: May 3, 2011

(54) BOARDING AND/OR ACCESS AID FOR VEHICLES WITH PASSENGER TRANSPORTATION

(76) Inventor: Werner Kircher, Ahnatal (DE)

( * ) Notice: Subject to any disclaimer, the term of this patent is extended or adjusted under 35 U.S.C. 154(b) by 662 days.

(21) Appl. No.: 12/015,662

(22) Filed: Jan. 17, 2008

(65) Prior Publication Data

US 2009/0184486 A1   Jul. 23, 2009

(30) Foreign Application Priority Data

Jan. 18, 2007   (DE) ...................... 20 2007 000 912 U

(51) Int. Cl.
*B60R 3/02* (2006.01)
(52) U.S. Cl. ..................................... 280/166; 280/164.2
(58) Field of Classification Search .................. 280/162, 280/163, 164, 166, 169; 187/200, 201, 202; 105/444, 449
See application file for complete search history.

(56) References Cited

U.S. PATENT DOCUMENTS

| | | | | | |
|---|---|---|---|---|---|
| 4,185,849 | A | * | 1/1980 | Jaeger | 280/166 |
| 4,570,962 | A | * | 2/1986 | Chavira | 280/166 |
| 5,228,707 | A | * | 7/1993 | Yoder | 280/166 |
| 5,375,962 | A | * | 12/1994 | Kempf | 414/541 |
| 5,505,022 | A | * | 4/1996 | Shibata et al. | 49/352 |
| 5,564,554 | A | * | 10/1996 | Lawrence | 198/432 |
| 6,409,458 | B1 | * | 6/2002 | Cohn et al. | 414/537 |
| 6,523,451 | B1 | * | 2/2003 | Liao et al. | 91/363 R |
| 6,655,706 | B1 | * | 12/2003 | Murrell | 280/166 |
| 7,469,916 | B2 | * | 12/2008 | Watson | 280/166 |
| 7,527,467 | B2 | * | 5/2009 | Edwards et al. | 414/537 |
| 2003/0042700 | A1 | * | 3/2003 | Ueno | 280/166 |
| 2006/0214386 | A1 | * | 9/2006 | Watson | 280/163 |
| 2007/0200313 | A1 | * | 8/2007 | Tazreiter | 280/166 |
| 2007/0205573 | A1 | * | 9/2007 | Hallmark | 280/163 |
| 2008/0143072 | A1 | * | 6/2008 | Parker | 280/166 |
| 2009/0184486 | A1 | * | 7/2009 | Kircher | 280/166 |

FOREIGN PATENT DOCUMENTS

| | | |
|---|---|---|
| DE | 103 51 988 | 11/2004 |
| DE | 10 2005 055 684 | 5/2007 |
| EP | 1393977 A1 * | 3/2004 |

* cited by examiner

*Primary Examiner* — J. Allen Shriver, II
*Assistant Examiner* — James Triggs
(74) *Attorney, Agent, or Firm* — Michael J. Striker

(57) ABSTRACT

A boarding and/or access aid for vehicles with passenger carrying service has a frame with two parallel side parts and an end profile connecting the latter, a step plate supported in the side parts so that it can be extended and retracted, and a drive for the step plate, supported on the frame, arranged between the two side parts and comprising a drive motor. The drive has a drive element, a chain or a belt, guided over at least one deflection roller, and a drive roller arranged in the area of the end profile, coupled to the drive motor, having a larger diameter than the deflection roller, and arranged in a inner space surrounded by the frame. A pressure roller acting from the outside on an upper belt side of the drive element is associated with the drive roller so that the upper belt strand is arranged between it and the deflection roller parallel to the movement path but underneath the latter.

13 Claims, 3 Drawing Sheets

BOARDING AND/OR ACCESS AID FOR VEHICLES WITH PASSENGER TRANSPORTATION

The invention relates to a boarding and/or an access aid in accordance with the preamble of claim 1.

Boarding and access aids of this type are known in numerous forms. They are used with vehicles for passenger transportation, for example, buses and rail vehicles for public short-distance transportation, and they facilitate boarding and deboarding vehicles by deploying, in the area of stops, a step plate which is in the form of a ramp, a linear step, or a similar part, and which is attached to the given vehicle in a manner which allows shifting and optionally also swiveling. The term boarding and access aid naturally also covers their use as a deboarding and departure aid.

The step plate, made of aluminum, for example, and provided with a slip-prevention coating, is provided with running wheels in a rear area, or coupled with a rolling cart that presents running wheels, where the running wheels are attached in a manner so they can be shifted back and forth in the side parts of a frame mounted beneath the vehicle floor. This construction serves the purpose of positioning the step plate, preferably before the opening of a vehicle door, between a standing and waiting area for persons to be transported, e.g., a platform, and between a bottom area in the boarding area of the vehicle in order to compensate any differences in level and/or any gap between these two areas or to make it easier to pass. This also makes it easier, e.g., for people in wheelchairs and those using baby buggies to board and alight. After the end of the alighting and boarding phase and possibly after the closing of the vehicle doors the step plate is returned to its starting position.

In a known boarding and/or access aid of the initially designated species (DE 103 51 988 A1) not only the running tracks for the wheels but also the drive means required for moving the step plate back and forth are housed in the frame fastened under or in the vehicle bottom. The drive means include a motor arranged in the back area of the frame and a crank gear connected to it and to the step plate and/or to the rolling carriage. This does result in the advantage that the step plate can be mounted together with the associated functional and drive parts and with the frame as a complete structural unit on the vehicle bottom. The structure of the drive means, which is relatively complicated and therefore associated with high production costs, and the circumstance that it is difficult when using high-performance drives to maintain the low overall height required for the structural unit are problematic.

A non-published application of the same applicant suggested providing a threaded spindle or a toothed belt instead of the crank gear (DE 10 2005 684). However, even such drive means are associated with high production costs and can only be used with low overall heights if the step plate is provided on its bottom with recesses for at least partially receiving the toothed belts or the like. However, that would be associated with a mechanical weakening of the step plate and would make additional measures necessary for meeting the usual static requirements placed on such step plates.

The problem which is the basis of the invention consists in designing the boarding and/or access aid of the type mentioned in the introduction in such a way that it can be manufactured with small construction height and cost effectively in spite of the use of a high-power drive.

The characterizing portions of claim 1 solve this problem.

The invention has the advantage that the drive unit, besides the motor, requires only a cost advantageous belt or chain drive and an additional pressing roller. Because of this construction, it is possible to limit the construction height of the entire construction unit to a value which is only slightly greater than the diameter of a drive roll for the drive element, which is designed as a belt or a chain. In addition, the drive element can be arranged in a substantially closed housing, and thus protected from soiling without substantial additional expenditure and in a simple way.

Additional advantageous characteristics of the invention can be obtained from the dependent claims.

The invention is described in greater detail below in connection with the drawing in the appendix in reference to embodiment examples. In the drawing.

Figure 1:
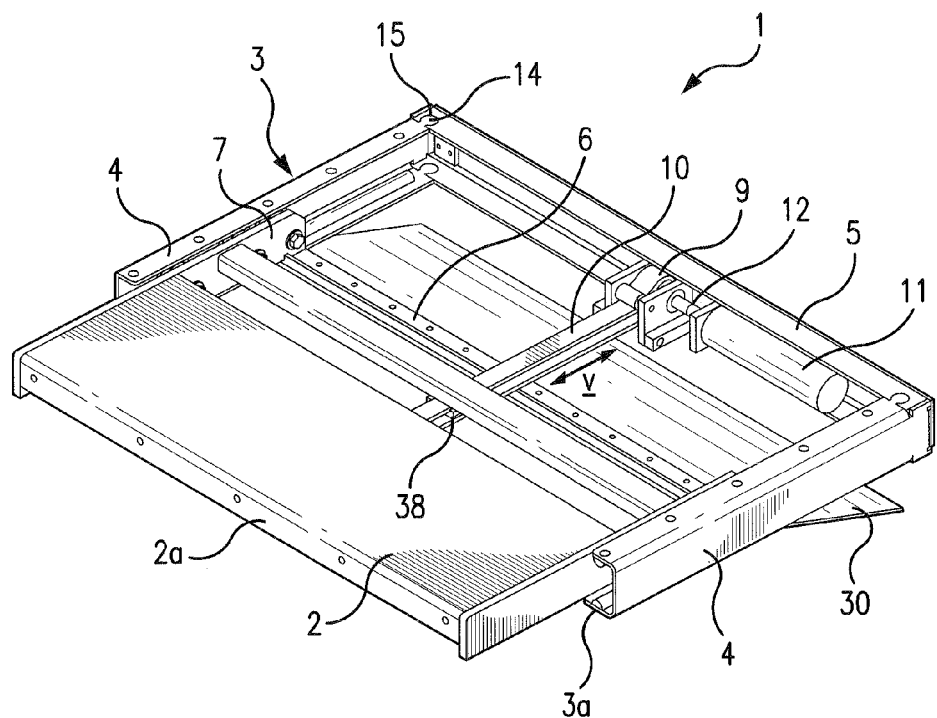
FIG. 1 shows a schematic perspective view of a boarding and/or access aid according to the invention, with a frame, a step plate which is connected to the frame in such a way that it can be moved in and out, and drive elements coupled with the step plate.
Figure 2:
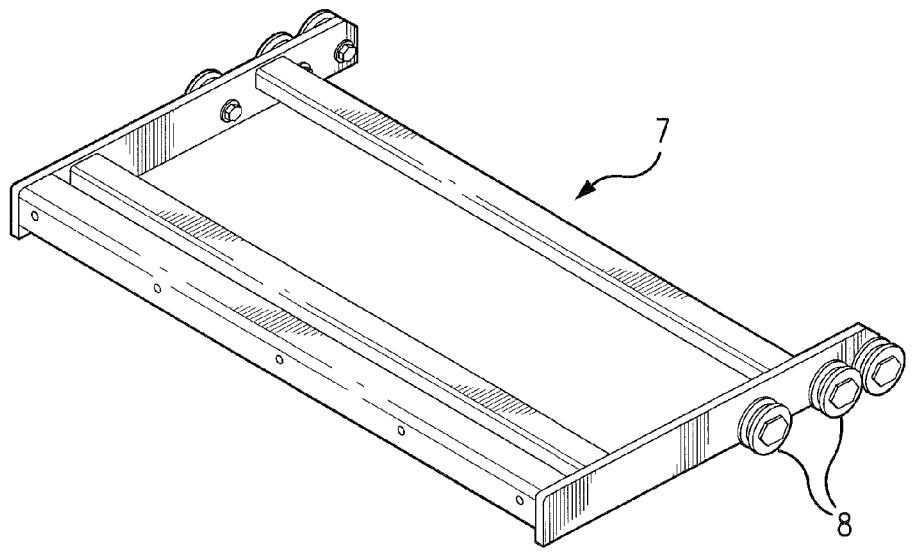
FIG. 2 shows a schematic, perspective view of a rolling cart, which is guided in such a way that it can be shifted in the frame of the boarding and/or access aid according to FIG. 1, and coupled with the step plate.
Figure 3:
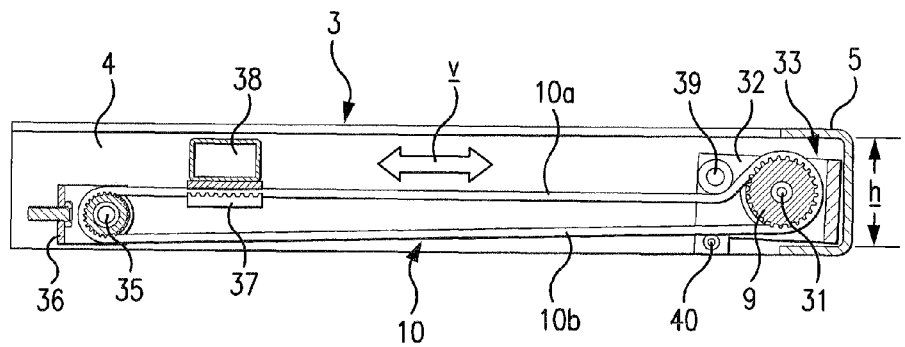
FIG. 3 shows a schematic longitudinal cross section through the frame and the drive means of the boarding and/or access aid according to FIG. 1.
Figure 4:
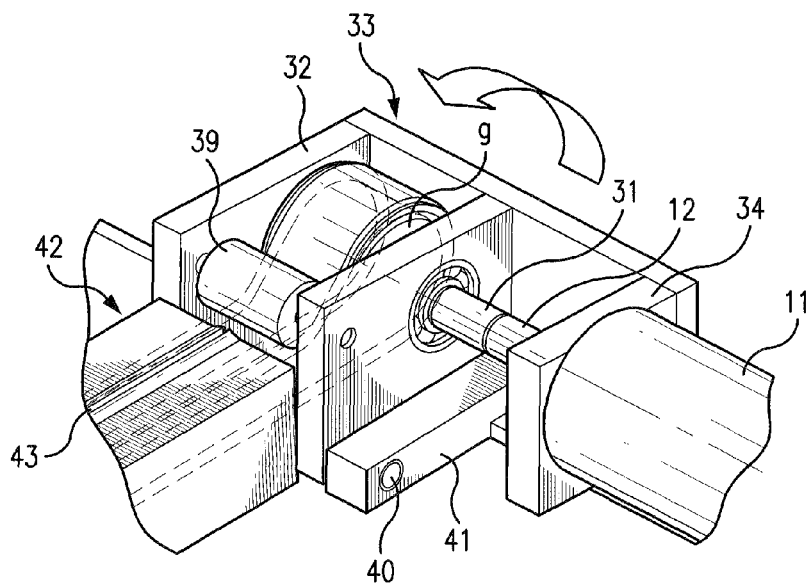
FIG. 4 shows a partial perspective view, which is enlarged compared to FIG. 3, of the drive means.
Figure 5:
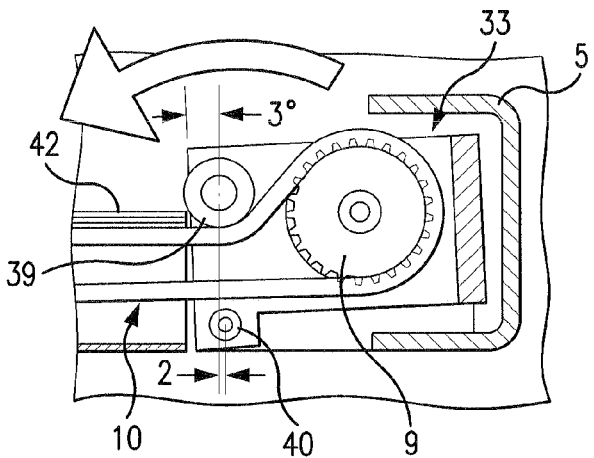
Figure 6:
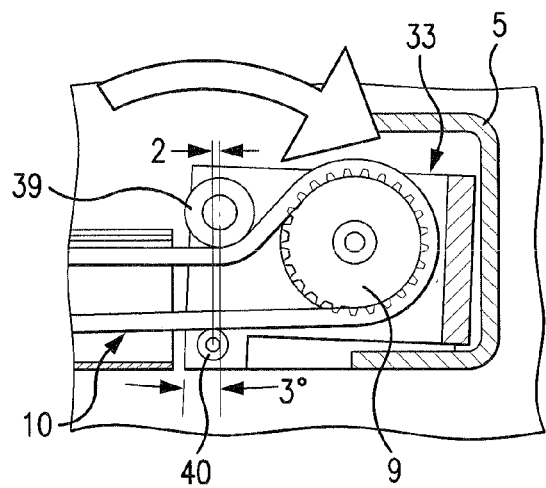
Figure 7:
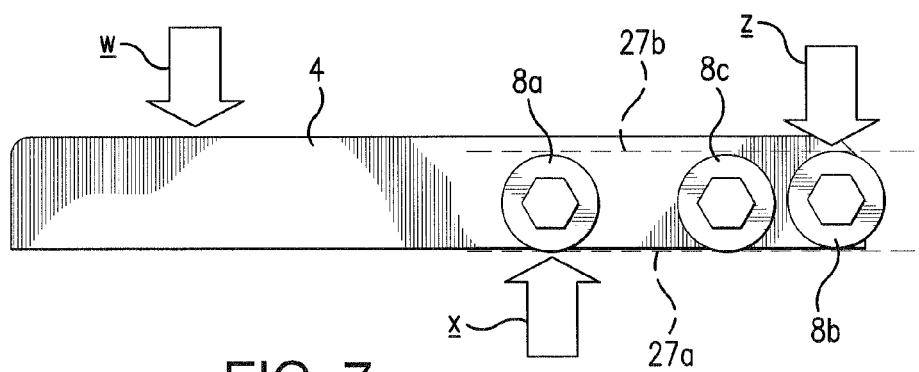

FIGS. 5 and 6 each show a partial, but enlarged, cross section according to FIG. 3 through a part of the drive means in two different positions of a pressing roll; and FIG. 7 shows a schematic side view from the interior of three running wheels of the rolling cart according to FIG. 2 and an associated side part of the frame of the boarding and/or access aid according to FIG. 1.

FIG. 1 shows a boarding and/or access aid 1 with a step plate 2, which can be formed, for example, on a bus or a similar vehicle. The boarding and/or access aid 1 according to FIG. 1 presents a rectangular frame 3 with two parallel side parts 4, which are connected by at least one brace 6 at the rear ends by an end profile 5 and a part, for example, a middle part, which is separated from the end profile. The side parts 4 are designed preferably as U-shaped guides that are open towards the interior, in which a rolling cart 7 (FIG. 2) of the step plate 2 is guided in such a way that it can be shifted, for example, by means of running wheels 8. As a result the step plate 2 can be moved forward and backward by the rolling cart 7 parallel to the side parts 4, and, with respect to the vehicle which is not shown, it can be advanced over a front end 3a of the frame 3 into a deployed position, which can be seen in FIG. 1, or pulled back into a retracted position, in which a front edge 2a of the step plate 2 forms a closure, substantially flush with the front end 3a of the frame 3. The rolling cart 7 forms, as shown in FIG. 2, an underframe of the step plate 2, on whose front section any step board 2b can be mounted, which can be provided with a grid, a metal plate with a nonslip coating, for example, made of rubber, or a similar part. In addition, a front part of the step plate 2 can be coupled in a known manner with the rolling cart 7 in such a way that it can be swiveled, instead of being coupled rigidly, to thus form, in the deployed state, a ramp which slopes slightly downward, and leads to a standing or waiting area, provided the standing or waiting area is not arranged at the same level as the frame 3.

If no swiveling of the step plate is necessary, the step plate itself can be provided in a rear area with the running wheels 8, and the rolling cart 7 can be omitted entirely.

In a front area of the frame 3, a deflection roller—not shown—is mounted in a bearing which allows rotation, where the deflection roller works in collaboration with a drive roller 9, which is rotatably attached in a bearing in the vicinity of the end profile 5. Both rollers are arranged in the middle between the two side parts 4 and they present rotation axes that extend parallel to the axles of the running roller 8 (FIG. 2) of the rolling cart 7. The two rollers serve to guide an endless drive element 10, which is designed, for example, as a chain, or a toothed belt, and connected with a rear end of the rolling cart 7 or of the step plate 2, and which extends in the middle between the side parts 4 and parallel to the latter. For the drive, a motor 11 is provided, which is mounted on the end profile 5, and which presents a drive shaft 12 which is arranged coaxially to the rotation axis of the drive roller 9, and which is connected, via a coupling which is not represented, or preferably directly, with a drive shaft of the drive roller 9. The motor 11 is designed preferably as a reversible motor, so that its output shaft can be rotated as desired in one or the other direction of rotation. As a result, the drive element 10, and with it also the rolling cart 7 and the step plate 2, can be moved back and forth in the direction of a double arrow v (FIG. 1).

On the bottom sides of the side parts 4 and of the end profile 5, and optionally of the support brace(s) 6, a floor—not shown—, which covers the frame 3 downward, can be attached, to protect the interior space of the frame 3 and the running wheels 8 and drive parts 9-12 contained therein from soiling. This floor preferably presents a swivelable service flap 30 (FIG. 1), which can be swiveled downward and which, in spite of the cover, allows easy access, if needed, to the drive parts 9-12 located in the rear area of the frame 3, which is advantageous particularly for servicing purposes (cleaning, repair, maintenance, etc.) and eliminates the need for a complicated dismantling of the entire frame 3 or similar part.

Alternatively, the floor may extend only to the last rear support brace 6, and the service flap 30 can be attached in a swivelable way by means of a hinge band or a similar part to this support brace 6.

FIGS. 3-6 show schematically an embodiment example of a drive means according to the invention, which presents the parts 9-12 according to FIG. 1. Here, the drive roller 9 is attached to a shaft 31, which is rotatably attached between two side walls 32 of a bearing block which overall has the reference numeral 33. The motor 11 is attached to a third side wall 34 of the bearing block 33, where its output shaft 12 protrudes through the side wall 34 and is rigidly connected by means of a coupling—not shown—with the shaft 31 which is arranged coaxially with respect to it.

According to FIG. 3, at a place which is separated from the end profile 5, for example, at one of the support braces 6, a deflection roller 35 is rotatably attached, for example, with the help of a bearing block 36 similar to the bearing block 33. The endless drive element 10, in the embodiment example a belt provided with an internal toothing, is placed over the two rollers 9 and 35 provided with an appropriate external toothing, and therefore presents in FIG. 3 an upper strand 10a and a lower strand 10b. The upper strand 10a is attached by means of a preferably toothed attachment plate 37 and attachment screws—not shown—on a coupling piece 38, which is firmly connected with the rolling cart 7 (FIG. 2) or the step plate 2 (FIG. 1). By rotating the drive roller 9 in either one of the directions of rotation, the coupling piece 38, and with it the rolling cart 7 or the step plate 2, can be moved back and forth parallel to the direction of the arrow v (see also FIG. 1), where the length of the upper strand 10a determines the maximum stroke of the shifting movements.

As can also be seen in FIGS. 3-6, the height of the space available for the drive means is established by the height h (FIG. 3) of the frame 3 or of its end profile 5. Therefore, if, as shown, the drive roller 9 is provided with a maximal diameter in view of this height h, as would be desirable to transmit a large torque, the deflection roller 35 would have to be provided with a corresponding diameter. Otherwise the upper strand 10a would be at a slant with respect to the transport path of the coupling piece 38, which is indicated by the arrow v, with the result that, when the coupling piece 38 is shifted in the direction of the arrow v, varying tension forces would have to be applied continuously perpendicularly with respect to the arrow direction. This is not desirable and should be avoided. In addition, FIGS. 1 and 3 show that the movement path of the step plate 2 or of the rolling cart 7 occupies a large part of the rear internal space delimited by the frame 3, and both the reflection roller 35 and also the upper strand 10a must lie beneath an imaginary backward extension of this movement path, so that the step plate 2 or the rolling cart 7 can be moved sufficiently backwards. If, therefore, the diameter given to the deflection roller 35 corresponds to the diameter of the drive roller 9, the construction height h of the frame 3 would have to be increased accordingly.

In contrast, the invention proposes, on the one hand, to provide the deflection roller 35 with a substantially smaller diameter than the drive roller 9, and to arrange the rotation axis of the deflection roller 35 in the frame 3 as low, for example in FIG. 3 as far towards the bottom, as is just still possible with a view to a problem-free running of the lower strand 10b. To prevent, nevertheless, a slanted position of the upper strand 10a, the invention provides, on the one hand, a pressing roller 39, which acts from outside on the upper strand 10a, and which, like the rollers 9 and 35, is rotatably attached about an axle that extends parallel to the axles of the running wheels 8. This pressing roller 39 is arranged between the rollers 35 and 9, and as close as possible to the drive roller 9, by being rotatably attached, for example, like the drive roller, in the side walls 32 of the bearing block 33, as shown clearly in FIGS. 4-6. In addition, the pressing roller 39, whose diameter is also advantageously substantially smaller than that of the drive roller 9, is arranged so deep in the frame 3, or in FIGS. 4-6 so far down, that, on the one hand, it does not protrude over the drive roller 9 upward, and, on the other hand, it holds the upper strand 10a of the drive element 10 precisely parallel to the running direction (arrow v), as shown particularly in FIG. 3. Between the pressing roller 39 and the drive roller 9, the drive element 10 can then rise at a comparatively steep slope to the greater height, which is determined by the diameter of the drive roller 9, without affecting the parallelism of the strand 10a with respect to the running direction of the step plate 2, in the area located between the deflection roller 35 and the pressing roller 39. A slanted position of the lower strand 10b (FIG. 8) would not be of any significance here.

It is particularly advantageous to use the pressing roller 39 simultaneously as a tension roller for the drive element 10. If the correct size is used for the length of the drive element 10, the tension can then be increased or decreased by a few tenths of a millimeter in the required way by a shift of the pressing roller 39 perpendicularly to the running direction, so that it would be possible to achieve an adjustable arrangement of the pressing roller 39 perpendicularly to its rotation axis and perpendicularly to the running direction of the strand 10a in the side walls 32. However, a particularly advantageous embodiment is achieved if the entire bearing block 33 is attached by means of a swiveling pin 40 in such a way that it can be swiveled on a block 41 shown in FIG. 4 (or between two such blocks 41), where the block is firmly connected with the end profile 5 or another frame part. It is then possible to increase or decrease the tension of the drive element 10 solely by swiveling the entire bearing block 33 by a few degrees in the direction of the arrow (FIGS. 5 and 6) about the swiveling pin 40, whose axis is arranged parallel to the rotation axis of the drive roller 9. To fix the desired tension of the drive element 10, a setting screw—not shown—or a similar device can be used.

The described measures provide the advantage that, on the one hand, the diameter of the drive roller 9 can be chosen to be sufficiently large, and, on the other hand, sufficient space remains nevertheless in the frame 3 for a linear movement of the coupling piece 38, without exerting during these movements a different traction or pressure on the strand 10a. In addition, if the service flap 30 (FIG. 1) is used, the additional advantage is achieved that, with opened service flap 30, the described drive means are all accessible from below, without requiring a complicated dismantling of a floor attached to the frame, or of a similar part.

To protect the drive element 10 from soiling, it is advantageous to surround it with a protective housing 42 (FIGS. 4-6) which extends between the rollers 35 and 39 and is substantially closed. The housing is provided at its top side with a longitudinal slit 43 (FIG. 4), in which the coupling piece 38 or a part thereof is guided in such a way that it can be moved back and forth. The longitudinal slit 43 extends parallel to the running direction v of the coupling piece 38 and it is provided advantageously with a flexible sealing lip, which is always opened only at precisely the place where the coupling piece 38 is located. If the protective housing 42 is used, the bottom, including the service flap 30 (FIG. 1), may be omitted entirely under some circumstances, because the running wheels 8 react less sensitively to soiling than a toothed belt or a similar part.

An additional preferred embodiment example of the invention contains according to FIG. 7 a special arrangement of the running wheels 8. In FIG. 7, three pairs of running wheels 8a, 8b and 8c are represented, which are guided in the facing side parts 4 of the frame 3. Here, the dotted lines 27a, 27b represent the positions of the lower and upper running rails, respectively, on one of the two participating side parts 4. To allow the running wheels 8 to be able to roll easily between these two running rails, without jamming, the two running rails 27a, 27b are separated by a distance which is slightly greater than the diameter of the running wheels 8a, 8b and 8c. In addition, the first running wheel pair 8a, in the deployment direction of the step plate 2, is braced against the lower running rails 27a so that there is some air with respect to the upper running rails 27b. In contrast, the rear running wheel pair 8b is braced on the upper running rails 27b in such a way that there is some air with respect to the lower running rails 27a. As a result, when a force is exerted in the direction of an arrow w, as would be the case in the deployed out state, no tipping torque is exerted on the step plate 2 or on the rolling cart 7. In the retracted state, however, the usual vibrations or similar events could result in tipping torques which press the wheel pair 8a upward and the wheel pair 8b downward (arrows x and z), potentially causing undesired rattling noises. According to the invention, at least one third, middle, running wheel pair 8c is provided, which is preferably height-adjustable and arranged so that it is also braced on the lower (or upper) running rails 27a (or 27b). If this running wheel pair 8c is arranged, for example, close to the rear running wheel pair 8b (FIG. 7), then the rolling cart 7 or the step plate 2 is braced firmly on the running wheel pairs 8a, 8c both in the deployed and in the retracted state, so that tipping movements are largely prevented.

The invention is not limited to the described embodiment examples, which can be modified in many ways. In the case of frames 3 of smaller construction sizes, it may be sufficient to provide the support braces 6 only at the front end 3a of the frame 3, instead of also or only in a middle part, to omit optionally the service flap 30, and to provide, instead of the latter, for example, an easily dismantable floor on the bottom side of the frame 3. Furthermore, the invention is not limited to the described embodiment of the drive unit. For example, if the pressing roller 39 is arranged in such a way that it can be shifted on the frame 3, then the motor 11 and the drive roller 9 can also be attached rigidly in the frame 3 or in the end profile 5. In addition, the drive element 10 could be manufactured from a belt or a similar part, which, for example, presents two ends that are interconnected by means of the coupling piece 38. It would also be possible to omit the bottom strand 10b entirely, and to wind or unwind the two ends of the drive element 10 on or from the rollers 9 and 35. Furthermore, to allow the easy shifting of the step plate 2 or of the rolling cart 7, it can be advantageous to manufacture the running wheels 8 from a rubber-like material or a plastic, instead of the usual steel, or to provide the running wheels with a coating made of rubber or a plastic. Furthermore, it is clear that the drive shaft 12 (FIG. 9) can also be the output shaft of a transmission which is connected after the motor 11. Finally, it should be understood that the different characteristics can also be used in combinations other than those that have been described and represented.

The invention claimed is:

1. Boarding and/or access aid for vehicles with passenger transportation, containing a frame (3) with two parallel side parts (4) and an end profile (5) which connects said parts, a step plate (2), which is attached in the side parts (4) along a movement path in such a way that it can be shifted in and out, and drive means driving the step plate (2), which are braced on the frame (3), arranged between the two side parts (4), and present a drive motor (11), where the drive motor (11) is arranged in a rear area of the frame (3), wherein the drive means contain a drive element (10), designed as a chain or belt, which is guided, over at least one deflection roller (35), which is arranged beneath the movement path, and a drive roller (9), which is arranged in an area of the end profile (5) and in a rear area of the frame (3), and coupled with the drive motor (11), where the drive roller presents a larger diameter than the deflection roller (35), and is arranged in an interior space delimited by the frame (3), and the drive roller (9) is associated with a pressing roller (39), which acts from an exterior onto an upper strand (10a) of the drive element (10), in such a way that the upper strand (10a) is arranged in an area which is located between the pressing roller (39) and the deflection roller (35) substantially parallel to the movement path, but beneath said path, and coupling piece (38) for coupling a rolling cart (7) to the drive element (10), wherein the upper strand (10a) and a lower strand (10b) of the drive element (10) extend parallel to one another, the driver roller (9) of the larger diameter and the deflection roller (35) of a smaller diameter are located between the upper strand (10a) and the lower strand (10b) inside the drive element (10) at opposite ends of the latter, the pressing roller (39) is located outside of the drive element (10), and the coupling piece (38) moves together with the upper strand (10a) of the drive element (10).

2. Boarding and/or access aid according to claim 1, wherein the drive motor (11) presents a drive shaft (12) which is connected directly to the drive roller (9).

3. Boarding and/or access aid according to claim 1, wherein the drive element (10) is a belt which is toothed on its interior side, and the deflection and drive rollers (9, 35) are provided with external toothings.

4. Boarding and/or access aid according to claim 1, wherein the side parts (4) are provided with guide rails (27), which are installed for guiding running wheels (8) of an element selected from the group consisting of the step plate (2) and a rolling cart (7) coupled to the plate, and in that the running wheels (8), the deflection roller (35) and the drive roller (9) are rotatable about axes that are arranged parallel to each other.

5. Boarding and/or access aid according to claim 4, wherein the drive element is selected from the group consisting of the drive element (10) which is endless, and the drive element with two ends that are connected to an endless drive element (10), and an upper strand (10a) is attached to an element selected from the group consisting of the step plate (2) and the rolling cart (7).

6. Boarding and/or access aid according to claim 1, wherein the drive motor (11) is attached to the end profile (5).

7. Boarding and/or access aid for vehicles with passenger transportation, containing a frame (3) with two parallel side parts (4) and an end profile (5) which connects said parts, a step plate (2), which is attached in the side parts (4) along a movement path in such a way that it can be shifted in and out, and drive means driving the step plate(2), which are braced on the frame (3), arranged between the two side parts (4), and present a drive motor (11), where the drive motor (11) is arranged in a rear area of the frame (3), wherein the drive means contain a drive element (10), designed as a chain or belt, which is guided, over at least one deflection roller (35), which is arranged beneath the movement path, and a drive roller (9), which is arranged in an area of the end profile (5) and in a rear area of the frame (3), and coupled with the drive motor (11), where the drive roller presents a larger diameter than the deflection roller (35), and is arranged in an interior space delimited by the frame (3), and the drive roller (9) is associated with a pressing roller (39), which acts from an exterior onto an upper strand (10a) of the drive element (10) in such a way that the upper strand (10a) is arranged in an area which is located between the pressing roller (39) and the deflection roller (35) substantially parallel to the movement path, but beneath said path, and the deflection roller (35) is held rigidly in a support bar (6) connecting the two side parts (4), and the pressing roller (39) is attached movably on the end profile (5).

8. Boarding and/or access aid according to claim 7, wherein the pressing roller (39), the drive roller (9) and the drive motor (11) are mounted in a bearing block (33), which is attached in such a way that it is swivelable by swiveling pin (40), which has a swivel axis that is parallel to an axis of the pressing roller (39), on an element selected from the group consisting of the end profile (5) and a rear end of the side parts (4).

9. Boarding and/or access aid according to claim 1, wherein the drive element (10) is surrounded by a substantially closed housing (42).

10. Boarding and/or access aid for vehicles with passenger transportation, containing a frame (3) with two parallel side parts (4) and an end profile (5) which connects said parts, a step plate (2), which is attached in the side parts (4) along a movement path in such a way that it can be shifted in and out, and drive means driving the step plate (2), which are braced on the frame (3), arranged between the two side parts (4), and present a drive motor (11), where the drive motor (11) is arranged in a rear area of the frame (3), wherein the drive means contain a drive element (10), designed as a chain or belt, which is guided, over at least one deflection roller (35), which is arranged beneath the movement path, and a drive roller (9), which is arranged in an area of the end profile (5) and in a rear area of the frame (3), and coupled with the drive motor (11), where the drive roller presents a larger diameter than the deflection roller (35), and is arranged in an interior space delimited by the frame (3), and the drive roller (9) is associated with a pressing roller (39), which acts from an exterior onto an upper strand (10a) of the drive element (10), in such a way that the upper strand (10a) is arranged in an area which is located between the pressing roller (39) and the deflection roller (35) substantially parallel to the movement path, but beneath said path, wherein the drive element (10) is surrounded by a substantially closed housing (42), and the housing (42) presents a longitudinal slit (43), which is open upward and covered with at least one sealing lip.

11. Boarding and/or access aid for vehicles with passenger transportation, containing a frame (3) with two parallel side parts (4) and an end profile (5) which connects said parts, a step plate (2), which is attached in the side parts (4) along a movement path in such a way that it can be shifted in and out, and drive means driving the step plate (2), which are braced on the frame (3), arranged between the two side parts (4), and present a drive motor (11), where the drive motor (11) is arranged in a rear area of the frame (3), wherein the drive means contain a drive element (10), designed as a chain or belt, which is guided, over at least one deflection roller (35), which is arranged beneath the movement path, and a drive roller (9), which is arranged in an area of the end profile (5) and in a rear area of the frame (3), and coupled with the drive motor (11), where the drive roller presents a larger diameter than the deflection roller (35), and is arranged in an interior space delimited by the frame (3), and the drive roller (9) is associated with a pressing roller (39), which acts from an exterior onto an upper strand (10a) of the drive element (10), in such a way that the upper strand (10a) is arranged in an area which is located between the pressing roller (39) and the deflection roller 35 substantially parallel to the movement path but beneath said path and on a bottom side of the frame (3), a floor covering an internal space is attached, which floor covering presents a service flap (30), which is swivelable downward, and which extends over at least a part of the drive means.

12. Boarding and/or access aid for vehicles with passenger transportation, containing a frame (3) with two parallel side parts (4) and an end profile (5) which connects said parts, a step plate (2), which is attached in the side parts (4) along a movement path in such a way that it can be shifted in and out, and drive means driving the step plate (2), which are braced on the frame (3), arranged between the two side parts (4), and present a drive motor (11), where the drive motor (11) is arranged in a rear area of the frame (3), wherein the drive means contain a drive element (10), designed as a chain or belt, which is guided, over at least one deflection roller (35), which is arranged beneath the movement path, and a drive roller (9), which is arranged in an area of the end profile (5) and in a rear area of the frame (3), and coupled with the drive motor (11), where the drive roller presents a larger diameter than the deflection roller (35), and is arranged in an interior space delimited by the frame (3), and the drive roller (9) is associated with a pressing roller (39), which acts from an exterior onto an upper strand (10a) of the drive element (10), in such a way that the upper strand (10a) is arranged in an area which is located between the pressing roller (39) and the deflection roller (35) substantially parallel to the movement path, but beneath said path, wherein the side parts (4) are provided with guide rails (27), which are installed for guiding running wheels (8) of an element selected from the group consisting of the step plate (2) and a rolling cart (7) coupled to the plate, and in that the running wheels (8), the deflection roller (35) and the drive roller (9) are rotatable about axes that are arranged parallel to each other, and an element selected from the group consisting of the step plate (2) and the rolling cart (7) contains at least three successively arranged pairs of running wheels (8a, 8b, 8c), where a pair (8a), in a front position in a deployment direction, is applied against a lower running rail (37a), a pair (8b), which is in a rear in the deployment direction, is applied on an upper running rail (27b), and a middle pair (8c) of running wheels, which compensates for tolerances and prevents tipping movements, is applied on a lower running rail (27a).

13. Boarding and/or access aid according to claim 4, wherein the running wheels (8) are selected from the group consisting of running wheels with a coating of rubber, running wheels with a coating of plastic, running wheels of rubber, and running wheels of plastic.

\* \* \* \* \*